United States Patent Office 3,394,087
Patented July 23, 1968

3,394,087
GLASS BONDED RESISTOR COMPOSITIONS CONTAINING REFRACTORY METAL NITRIDES AND REFRACTORY METAL
Cornelius Y. D. Huang, Bala Cynwyd, and Kenneth M. Merz, Malvern, Pa., assignors to IRC, Inc., Philadelphia, Pa.
No Drawing. Filed Feb. 1, 1966, Ser. No. 523,909
4 Claims. (Cl. 252—512)

ABSTRACT OF THE DISCLOSURE

A vitreous enamel resistance material comprising a mixture of by volume 95% to 50% of a vitreous glass frit and 5% to 50% of a mixture of fine particles of a refractory metal nitride and fine particles of a refractory metal with the ratio of the refractory metal nitride to the refractory metal being between 0.5 to 5 parts of the refractory metal nitride to 1 part of the refractory metal. The refractory metal nitride can be titanium nitride, zirconium nitride, hafnium nitride, vanadium nitride, niobium nitride, tantalum nitride, chromium nitride, molybdenum nitride or tungsten nitride, and the refractory metal can be any of the metals of these nitrides. A resistor is made with this material by coating the surface of a substrate with the material and then firing the coated substrate at a temperature at which the glass frit becomes molten. When the substrate is cooled, the glass hardens to provide a glass film having the particles of the refractory metal nitride and the refractory metal embedded and dispersed throughout the glass film.

---

The present invention relates to an electrical resistance material and an electrical resistor made therefrom. More particularly, the present invention relates to a vitreous enamel electrical resistance material and an electrical resistor made therefrom.

A type of electrical resistance material which has recently come into commercial use is a vitreous enamel resistance material which comprises a mixture of a glass frit and finely divided particles of an electrical conductive material. The vitreous enamel resistance material is coated on the surface of a substrate of an electrical insulating material, usually a ceramic, and fired to melt the glass frit. When cooled, there is provided a film of glass having the conductive particles dispersed therein. Terminations are connected to the film to permit the resultant resistor to be connected in the desired circuit.

The materials which have been generally used for the conductive particles are the noble metals. Although the noble metals provide vitreous enamel resistance materials which have satisfactory electrical characteristics, they have the disadvantage that they are expensive. Thus, the resistors made from the vitreous enamel resistance materials containing the noble metals are expensive to manufacture. Therefore, it would be desirable to have a vitreous enamel electrical resistance material which utilizes a relatively inexpensive conductive material so as to provide an electrical resistor which is inexpensive to manufacture. In addition, the conductive material used must be capable of providing a resistance material having a wide range of resistance values and which is relatively stable over the entire range of the resistance values. By being stable it is meant that the resistance value of the resistance material does not change or changes only a small amount under operating conditions, particularly when subjected to changes in temperature. The change in resistance value of an electrical resistor per degree change in temperature is referred to as the "temperature coefficient of resistance" of the resistor. The closer the temperature coefficient of resistance is to zero, the more stable is the resistor with respect to change in temperature.

It is an object of the present invention to provide a novel resistance material.

It is another object of the present invention to provide a novel vitreous enamel resistance material.

It is still another object of the present invention to provide a vitreous enamel resistance material utilizing a relatively inexpensive conductive material.

It is a further object of the present invention to provide an electrical resistor utilizing a novel vitreous enamel resistance material.

It is a still further object of the present invention to provide a vitreous enamel electrical resistor having a relatively wide range of resistance values, which is relatively stable over the entire range of resistance values, and which is relatively inexpensive to manufacture.

Other objects will appear hereinafter.

The invention accordingly comprises a composition of matter and the product formed therewith possessing the characteristics, properties and relation of constituents which will be exemplified in the composition hereinafter described, and the scope of the invention will be indicated in the claims.

In general, the vitreous enamel resistance material of the present invention comprises a mixture of a vitreous glass frit, fine particles of a refractory metal nitride, and fine particles of a refractory metal. The refractory metal nitride can be titanium nitride, zirconium nitride, hafnium nitride, vanadium nitride, niobium nitride, tantalum nitride, chromium nitride, molybdenum nitride or tungsten nitride, and the refractory metal can be any of these metals of these nitrides. Although it is preferable to use the same metal as that of the nitride, it has been found that any of the refractory metals can be used with any of the refractory nitrides to produce a suitable resistance material.

More particularly, the vitreous enamel resistance material of the present invention comprises a mixture of a vitreous glass frit, a finely divided refractory metal nitride and a finely divided refractory metal in the preparation, by volume, of 95% to 50% glass frit and 5% to 50% refractory metal nitride and refractory metal combined. The ratio of the refractory metal nitride to the refractory metal used in the vitreous enamel resistance material can be between 0.5 to 5 parts of the refractory metal nitride to 1 part of the refractory metal.

The glass frit used in the resistance material of the present invention may be of any well-known composition which has a melting temperature below that of the refractory metal nitride and the refractory metal. The glass frits most preferably used are the borosilicate frits, such as lead borosilicate frit, bismuth, cadmium, barium, calcium or other alkaline earth borosilicate frits. The preparation of such glass frits is well known and consists, for example, in melting together the constituents of the glass in the form of the oxides of the constituents, and pouring such molten composition into water to form the frit. The batch ingredients may, of course, be any compound that will yield the desired oxides under the usual conditions of frit production. For example, boric oxide will be obtained from boric acid, silicon dioxide will be produced from flint, barium oxide will be produced from barium carbonate, etc. The coarse frit is preferably milled in a ball mill with water to reduce the particle size of the frit and to obtain a frit of substantially uniform size.

To make the resistance material of the present invention, the glass frit, refractory metal nitride and refractory metal are broken down, such as by ball milling, to a substantially uniform particle size. An average particle below 2 microns has been found to be preferable. The glass frit, refractory metal nitride powder and refractory metal powder are thoroughly mixed together, such as by ball-milling in water or an organic medium, such as butyl carbitol acetate or a mixture of butyl carbitol acetate and toluol. The mixture is then adjusted to the proper viscosity for the desired manner of applying the resistance material to a substrate by either adding or removing the liquid medium of the material.

To make a resistor with the resistance material of the present invention, the resistance material is applied to a uniform thickness on the surface of a substrate. The substrate may be a body of any material which can withstand the firing temperature of the resistance material composition. The substrate is generally a body of a ceramic, such as glass, porcelain, steatite, barium, titanate, alumina, or the like. The resistance material may be applied on the substrate by brushing, dipping, spraying, or screen stencil application. The substrate with the resistance material coating is then fired in a conventional furnace at a temperature at which the glass frit becomes molten. The resistance material is preferably fired in an inert atmosphere, such as argon, helium or nitrogen, or a reducing atmosphere, such as hydrogen or a mixture of nitrogen and hydrogen. Although the particular firing temperature used depends on the melting temperature of the particular glass frit used, it has been found that the higher the firing temperature used, the greater will be the stability of the resulting resistor. For this purpose, it has been found that the inclusion in the resistance material composition of small quantities of certain materials, such as clay, will increase the firing temperature without adversely affecting the electrical properties of the resulting resistors. When the substrate and resistance material is cooled, the vitreous enamel hardens to bond the resistance material to the substrate.

Table I shows the composition of a number of resistors of the present invention in which the conductive material is a mixture of tantalum nitride and various refractory metals, and the glass frit is a barium, calcium borosilicate. The resistors shown in Table I were made by mixing together the glass frit, conductive materials and clay in the proportions shown in a ball-mill in butyl carbitol acetate. The resistance material was coated on cylindrical ceramic bodies which were fired in a furnace containing a nitrogen atmosphere. The resistors were fired at a temperature of 970° C. for approximately 30 minutes. A number of resistors of each of the compositions were made, and the average resistance values and temperature coefficient of resistance of the resulting resistors of each group are shown in Table II.

TABLE I

| Composition (% by volume) | 1 | 2 | 3 | 4 | 5 | 6 | 7 | 8 | 9 | 10 |
|---|---|---|---|---|---|---|---|---|---|---|
| Glass Frit | 63.6 | 65.7 | 71.6 | 71.6 | 74.9 | 73.0 | 70.8 | 57.5 | 69.5 | 64.3 |
| Clay | 12.5 | 12.1 | 11.0 | 11.0 | 10.3 | 10.6 | 11.2 | 13.7 | 10.2 | 12.6 |
| TaN | 16.0 | 18.4 | 12.3 | 14.0 | 9.9 | 11.0 | 12.1 | 19.3 | 10.4 | 16.2 |
| Ta | 7.9 | 3.8 | 5.1 | 3.4 | 4.9 | 5.4 | 5.9 | 9.5 | | |
| Nb | | | | | | | | | 9.9 | |
| W | | | | | | | | | | 6.9 |

TABLE II

| | Resistance (ohms/□) | Temperature Coefficient of Resistance (percent per ° C.) | |
|---|---|---|---|
| | | +25° C. to +105° C. | +25° C. to −55° C. |
| 1 | 100 | +.0053 | +.0072 |
| 2 | 1,600 | −.0101 | −.0124 |
| 3 | 2,000 | −.0077 | −.0063 |
| 4 | 30,000 | −.0422 | −.0449 |
| 5 | 3,500 | −.0115 | −.0102 |
| 6 | 1,250 | −.0054 | ±.0034 |
| 7 | 312 | ±.0016 | ±.0024 |
| 8 | 31 | +.0122 | +.0168 |
| 9 | 100 | −.0014 | ±.0005 |
| 10 | 5,000 | −.0548 | −.0542 |

Table III shows the composition of resistors of the present invention in which the conductive material is a mixture of other refractory nitrides and refractory metals, and the glass frit is a barium, calcium borosilicate. Resistors of the compositions shown in Table III were made in the same manner previously described with regard to the resistors shown in Table I. The resulting resistors had the average resistance values and temperature coefficient of resistance shown in Table IV.

TABLE III

| Composition (Percent by volume) | 11 | 12 | 13 | 14 | 15 |
|---|---|---|---|---|---|
| Glass Frit | 76.8 | 80.6 | 63.1 | 69.8 | 64.3 |
| Clay | 8.1 | 7.8 | 8.2 | 7.4 | 9.9 |
| NbN | 10.1 | 7.8 | | | |
| $Cr_2N_2$ | | | 20.4 | | |
| TiN | | | | 14.2 | |
| MoN | | | | | 17.2 |
| Nb | 5.0 | 3.8 | | | |
| Cr | | | 8.3 | | |
| Ti | | | | 8.6 | |
| Mo | | | | | 8.6 |

TABLE IV

| | Resistance (ohms/□) | Temperature Coefficient of Resistance (percent per ° C.) | |
|---|---|---|---|
| | | +25° C. to +105° C. | +25° C. to −55° C. |
| 11 | 200 | +.030 | +.036 |
| 12 | 250 | +.039 | +.048 |
| 13 | 40 | +.125 | +.138 |
| 14 | 20 | +.009 | +.006 |
| 15 | 250 | −.042 | −.062 |

It should be understood that the examples of the resistors and resistance materials of the present invention shown in Tables I through IV are given merely to illustrate certain details of the invention, and are not to be taken as in any way limiting the invention thereto. The present invention may be embodied in other specific forms without departing from the spirit or essential attributes thereof, and, accordingly, reference should be made to the appending claims, rather than to the foregoing specification as indicating the scope of the invention.

We claim:
1. A vitreous enamel resistor composition adapted to be applied to and fired on a substrate to form an electrical resistor consisting essentially of by volume 50% to 95% glass frit and 50% to 5% a mixture of finely divided particles of a refractory metal nitride selected from the group consisting of titanium nitride, zirconium nitride, hafnium nitride, vanadium nitride, niobium nitride, tantalum nitride, chromium nitride, molybdenum nitride and tungsten nitride and finely divided particles of a refractory metal selected from the group consisting of titanium, zirconium, hafnium, vanadium, niobium, tantalum, chromium, molybdenum and tungsten, the ratio of the refractory metal nitride to the refractory metal being between 0.5 to 5 parts of the refractory metal nitride to 1 part of the refractory metal.

2. A vitreous enamel resistor composition in accordance with claim 1 in which the refractory metal is the same as that of the refractory metal nitride.

3. An electrical resistor comprising a ceramic body containing on the surface thereof a coating of a vitreous enamel resistor composition consisting essentially of, by volume, 50% to 5% a mixture of finely divided particles of a refractory metal nitride and finely divided particles of a refractory metal embedded in a glass matrix, said refractory metal nitride being selected from the group consisting of titanium nitride, zirconium nitride, hafnium nitride, vanadium nitride, niobium nitride, tantalum nitride, chromium nitride, molybdenum nitride and tungsten nitride, and said refractory metal being selected from the group consisting of titanium, zirconium, hafnium, vanadium, niobium, tantalum, chromium, molybdenum and tungsten, the ratio of the refractory metal nitride to the refractory metal being between 0.5 to 5 parts of the refractory metal nitride to 1 part of the refractory metal.

4. A vitreous enamel resistor composition in accordance with claim 4 in which the refractory metal is the same as that of the refractory metal nitride.

References Cited

UNITED STATES PATENTS 2,845,515  7/1958  Anderson et al. _____ 252—512
3,052,573  9/1962  Dumesnil _____ 252—514

FOREIGN PATENTS 1,097,533  1/1961  Germany.

OTHER REFERENCES

Chemical Abstracts, vol. 53, col. 16906f, (1959).

LEON D. ROSDOL, *Primary Examiner.*
J. D. WELSH, *Assistant Examiner.*

UNITED STATES PATENT OFFICE
CERTIFICATE OF CORRECTION

Patent No. 3,394,087                                    July 23, 1968

Cornelius Y. D. Huang et al.

It is certified that error appears in the above identified patent and that said Letters Patent are hereby corrected as shown below:

In the heading to the printed specification, lines 6 and 7, "IRC, Inc., Philadelphia, Pa." should read -- TRW Inc., a corporation of Ohio --.

Signed and sealed this 3rd day of March 1970.

(SEAL)
Attest:

Edward M. Fletcher, Jr.                         WILLIAM E. SCHUYLER, JR.
Attesting Officer                                   Commissioner of Patents